(12) United States Patent
Moller et al.

(10) Patent No.: US 7,011,613 B2
(45) Date of Patent: Mar. 14, 2006

(54) SPINDLE COMPRISING A DATA STORAGE ELEMENT

(75) Inventors: Bernd Moller, Hersbruck (DE); Edgar Verlemann, Nürnberg (DE)

(73) Assignee: Paul Müller GmbH & Co. KG Unternehmensbeteiligungen, Nünberg (DE)

( * ) Notice: Subject to any disclaimer, the term of this patent is extended or adjusted under 35 U.S.C. 154(b) by 0 days.

(21) Appl. No.: 10/204,063

(22) PCT Filed: Feb. 2, 2001

(86) PCT No.: PCT/DE01/00434

§ 371 (c)(1),
(2), (4) Date: Nov. 14, 2002

(87) PCT Pub. No.: WO01/60562

PCT Pub. Date: Aug. 23, 2001

(65) Prior Publication Data

US 2003/0103827 A1    Jun. 5, 2003

(30) Foreign Application Priority Data

Feb. 17, 2000    (DE) ................................ 100 07 126

(51) Int. Cl.
*B23Q 3/157* (2006.01)
(52) U.S. Cl. ................. 483/1; 483/11; 483/7; 409/231; 409/230; 409/186; 408/8; 408/238; 702/183; 700/9; 700/81; 700/174; 700/177
(58) Field of Classification Search ................ 409/231, 409/230, 144, 186, 193, 207, 232, 135–136; 408/89, 238, 16; 702/182–186; 700/9, 81, 700/174, 177; 483/901, 8, 9, 1, 11, 7; 901/41; 310/52
See application file for complete search history.

(56) References Cited

U.S. PATENT DOCUMENTS

| | | | | |
|---|---|---|---|---|
| 3,882,305 A | * | 5/1975 | Johnstone | 702/183 |
| 4,109,309 A | * | 8/1978 | Johnstone et al. | 700/177 |
| 4,535,850 A | * | 8/1985 | Alexander | 81/477 |
| 4,588,339 A | * | 5/1986 | Bilz | 408/16 |
| 4,742,470 A | * | 5/1988 | Juengel | 700/175 |
| 4,773,815 A | * | 9/1988 | Lemelson | 483/901 |
| 4,809,426 A | * | 3/1989 | Takeuchi et al. | 365/64 |
| 4,995,877 A | * | 2/1991 | Ams et al. | 606/180 |
| 5,124,622 A | * | 6/1992 | Kawamura et al. | 700/177 |
| 5,224,230 A | * | 7/1993 | Vanicsek et al. | 409/230 |
| 5,274,546 A | * | 12/1993 | Kinoshita | 700/81 |
| 5,388,051 A | * | 2/1995 | Seki et al. | 700/169 |
| 5,535,646 A | * | 7/1996 | Allen et al. | 81/57.39 |
| 5,564,872 A | * | 10/1996 | Veil et al. | 409/230 |
| 5,690,137 A | * | 11/1997 | Yamada | 409/136 |

(Continued)

FOREIGN PATENT DOCUMENTS

DE         3611447 A1 * 10/1987

(Continued)

*Primary Examiner*—Erica Cadugan
(74) *Attorney, Agent, or Firm*—Collard & Roe, P.C.

(57) ABSTRACT

The invention relates to a spindle (9) for a machine tool, having a housing (12) to accommodate an electric motor (11) and a shaft (13) driven by the latter and having a tool holder for a tool (10) for machining workpieces, at least one data acquisition element (2) being provided to record operating and/or state data of the spindle (9), and at least one spindle-integrated data storage element (1) being provided to store the recorded data from the data acquisition element (2).

28 Claims, 1 Drawing Sheet

U.S. PATENT DOCUMENTS

| | | | |
|---|---|---|---|
| 5,893,685 A * | 4/1999 | Olson et al. | 483/51 |
| 5,903,462 A | 5/1999 | Wagner et al. | |
| 6,144,123 A * | 11/2000 | Selci | 310/52 |
| 6,219,583 B1 * | 4/2001 | Kinoshita et al. | 700/3 |
| 6,402,443 B1 * | 6/2002 | Hoppe | 409/230 |
| 6,474,914 B1 * | 11/2002 | Lang | 409/144 |
| 6,585,628 B1 * | 7/2003 | Tsung et al. | 483/9 |
| 6,607,041 B1 * | 8/2003 | Suzuki et al. | 702/182 |

FOREIGN PATENT DOCUMENTS

| | | |
|---|---|---|
| EP | 0329944 A | 8/1989 |

* cited by examiner

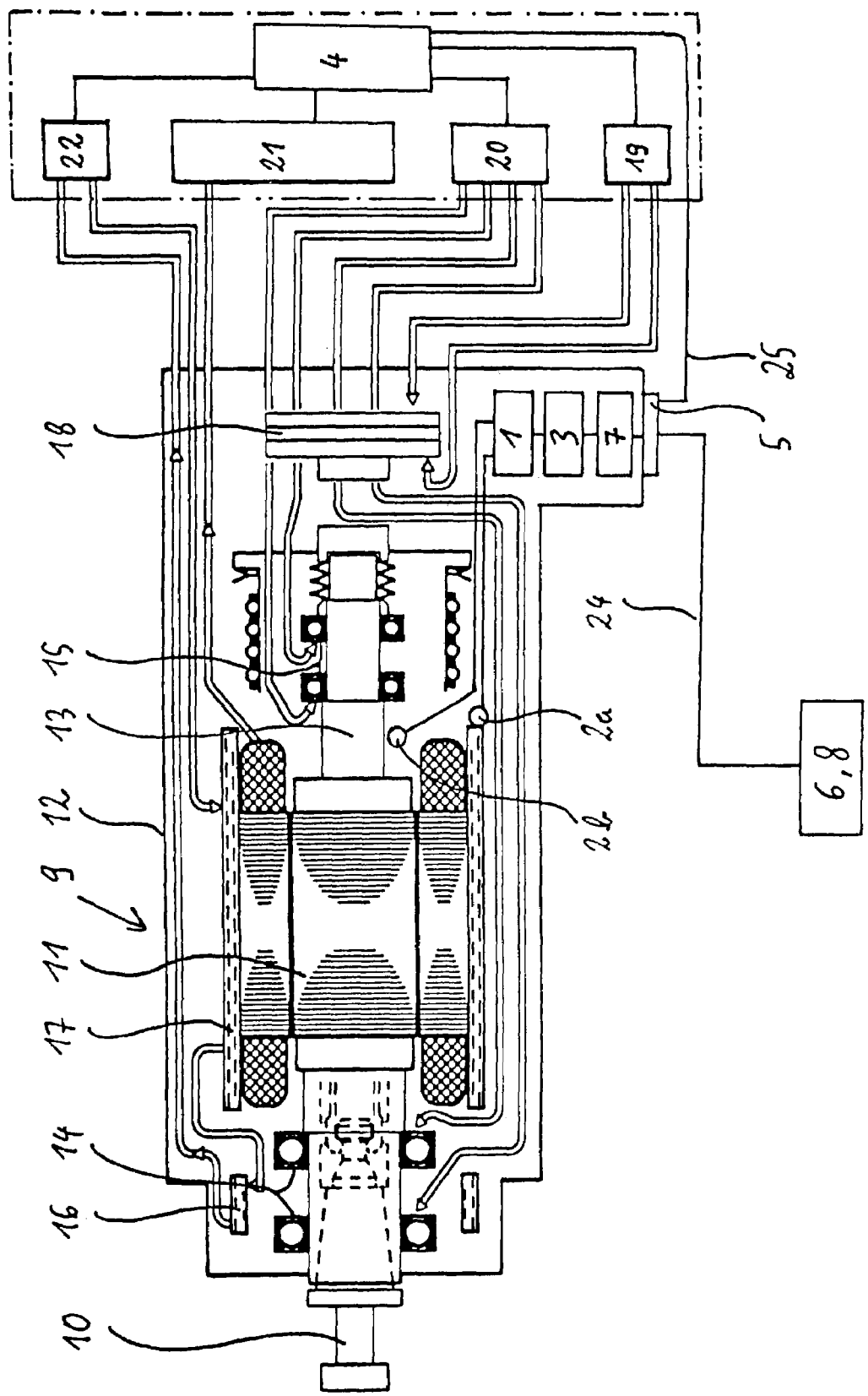

SPINDLE COMPRISING A DATA STORAGE ELEMENT

CROSS-REFERENCE TO RELATED APPLICATIONS

Applicants claim priority under 35 U.S.C. §119 of German Application No. 100 07 126.0 filed Feb. 17, 2000. Applicants also claim priority under 35 U.S.C. §365 of PCT/DE01/00434 filed Feb. 2, 2001. The international application under PCT article 21(2) was not published in English.

The invention relates to a spindle for a machine tool having at least one data acquisition element to record operating and/or state data of spindle. Furthermore, the invention relates to a method of operating a spindle for a machine tool having at least one data acquisition element to record operating and/or state data of the spindle.

Spindles for machine tools are known as the prior art, the spindle being connected to a machine control system of the machine tool in order to drive the electric motor and in order to acquire the data from the data acquisition elements (sensors) of the spindle. Separate acquisition or processing of the data from the sensors, for example by the manufacturer of the spindle, is not possible without intervention in the machine control system of the machine tool.

The invention is based on the object of providing a spindle for a machine tool and a method of operating a spindle for a machine tool, in which separate acquisition of the operating and/or state data of the spindle is made possible without intervention in the machine control system of the machine tool.

The object is achieved by a high-speed motor spindle having a housing to accommodate an electric motor and a shaft driven by the motor, and having a tool holder for a tool for machining workpieces with at least one data acquisition element being provided to record operating and/or state data of the spindle, wherein at least one spindle-integrated data storage element is provided to store the recorded data from the data acquisition element. Advantageous embodiments of the spindle are described below. With regard to the method, the object is achieved by a method of operating such a spindle wherein the recorded data from the spindle stored by at least one spindle-integrated data storage element. Advantageous method variants are described below.

In the following text, the term "spindle" is to be understood in general terms and comprises, for example, a motor spindle having a housing to accommodate an electric motor and a belt-driven spindle with an external drive motor. Furthermore, the spindle can be used either to hold tools (for example for grinding machines) or to hold workpieces (for example for turning machines).

In the spindle according to the invention, at least one spindle-integrated data storage element is provided to store the recorded data from the data acquisition element or elements (sensors) of the spindle. In this case, the term "spindle-integrated" is to be understood to mean both integration of the data storage element in the housing of the spindle and fitting to the outside of the housing of the spindle.

As distinct from the prior art, the data storage element is not associated with the motor control system of the machine tool or integrated physically into the motor control system. In the event of replacement of the spindle, the data storage element can be read separately by the service personnel, that is to say by the manufacturer of the spindle, and suitable diagnostic systems can be connected to the data storage element without intervention in the machine control system of the machine tool being necessary. Therefore—if desired—access by the machine control system (and therefore by the manufacturer or operator of the machine tool) to the data storage element can also be blocked, partially or completely, in order to make internal and secret data which is related to the spindle accessible only to the manufacturer of the spindle. This may be of importance, for example, in connection with functional disruption and any guarantee claims associated with this by the manufacturer or operator of the machine tool with respect to the manufacturer of the spindle.

A plurality of sensors are advantageously provided in the spindle, for example for determining the temperature of the bearings and of the motor, the angular position, the vibration travel, the leakage etc., which store the recorded operating and state data in the spindle-integrated data storage element. When the spindle is running, in the event of repair or in the event of replacement of the spindle, by reading the spindle-integrated data storage element, conclusions about the operating behavior of the spindle can be drawn, and the causes of functional disruption can be determined or investigated.

In a further advantageous embodiment, the spindle has at least one spindle-integrated data processing element connected to the data storage element for processing or conditioning the data stored in the data storage element and coming from the sensors of the spindle. The spindle can therefore have an integrated EDP unit, in which the sensor data can be digitized and conditioned. In this case, individual measured variables from various sensors can also be processed in combined form so that, for example if temperature data is linked to rotational speed data, a corresponding axial displacement of the spindle shaft of the spindle can be determined with micron accuracy. In addition, the sensor data can be conditioned to produce a data bus structure.

In a particularly advantageous embodiment, the data processing element is used for the data compression of the data recorded by the data acquisition element, in particular of recorded vibration signals. This data compression can be achieved by an encoder integrated in the data processing element, as a result of which the amount of data recorded by the data acquisition element is reduced, by unimportant components of this quantity of data being ignored. This produces data packets of reduced size, which can be passed on via the spindle-integrated interface to data transmission, for example to an external EDP station, it being possible there for a frequency analysis of the recorded vibration signals to take place. As a result of the data compression in the data processing element, the recorded vibration signals can be transmitted from the data processing element to the external EDP station within a tolerable short time period.

The data storage element and/or the data processing element of the spindle can be connected to the machine control system of the machine tool in order to forward individual items or a specific amount of desired sensor data to the machine control system. Here, forwarding specific sensor data which is intended only for the manufacturer of the spindle can be prevented.

According to a further advantageous embodiment, a data storage element and/or the data processing element of the spindle has/have a spindle-integrated interface, in order to permit data transmission, in particular to an external EDP station.

In this connection, provision is made in particular of a spindle-integrated modem element, for example in the manner of a plug-in card for personal computers, in order to be able to dial into the respective spindle via a provider from an external EDP station (for example a personal computer at the manufacturer of the spindle) and in order to make data transmission possible between the external EDP station and the unit comprising data storage element and/or data processing element and modem element.

In this case, data transmission between spindle and the external EDP station via the spindle-integrated interface can take place in accordance with an Internet data protocol. The connection between external EDP station and spindle can be provided as required via a telephone line or else be present as a dedicated line. Furthermore, all the line systems (for example including the power network) can be used for data transmission.

According to an advantageous embodiment, a data connection from the spindle to an external EDP station can also be produced as required, so that, starting from the spindle, by dialing the IP address of the external EDP station, a data connection like that between two personal computers is produced.

In the event of data transmission in accordance with an Internet data protocol, in addition or as an alternative, a TCP/IP data protocol (Transmission Control Protocol/Internet Protocol), an SMTP data protocol (Simple Mail Transfer Protocol), a POP data protocol (Post Office Protocol), HTTP data protocol (Hypertext Transfer Protocol), NNTP data protocol (Network News Transfer Protocol), an FTP data protocol (File Transfer Protocol) and/or a WAP data protocol (Wireless Application Protocol) can be used.

The selection of the respective data protocol depends inter alia on the type and amount of data to be transmitted. If it is desired that the service personnel want to interrogate specific characteristic values of the spindle from the data storage element via a mobile telephone, for example a data transmission in accordance with the WAP data protocol (Wireless Application Protocol) could take place.

The spindle-integrated interface can be designed for cable-bound or cable-free data transmission (for example via radio signals, infrared signals, etc.). In the case of cable-free data transmission, the sensor data stored in the spindle-integrated data acquisition element can be read out, for example by service personnel, via a suitable radio-controlled or infrared-controlled data reader.

The spindle-integrated interface can be designed, for example, as an RS232/RS485 interface, by which means, for example, an external EDP station, which is used as a diagnostic computer by the service personnel on site, can be connected to the spindle-integrated data storage element and/or data acquisition element in order to read out the sensor data present.

Furthermore, the interface can be designed as a data bus interface, for example for the transmission of data bus protocols in accordance with the Standards USB (PC), PROFIBUS-DP, INTERBUS-S, CAN-BUS and SERCOS.

In this case, the spindle-integrated interface can be connected, for example, to the external EDP station or else—if desired—to the machine control system of the machine tool, in order to permit (limited) access by the machine control system to the spindle-integrated data storage element and/or data acquisition element. The spindle-integrated interface can have a testing function and be used both for data transmission in each case of different data streams to the machine control system of the machine tool and, for example, to the external EDP station.

Alternatively, two spindle-integrated interfaces can also be provided, one as a connection to the machine control system and the other as a connection to the external EDP station.

Overall, the term "external EDP station" designates any technical element which is suitable to receive and/or transmit data for the purpose of data transmission. This can be, for example, a local EDP diagnostic system belonging to the service personnel, a mobile telephone or a personal computer connected to the spindle via remote data transmission (for example via an Internet connection) or an EDP system belonging to the manufacturer of the spindle.

In the method according to the invention of operating a spindle for a machine tool, the recorded data from a data acquisition element (sensor) of the spindle is stored by at least one spindle-integrated data storage element. In addition, a spindle-integrated data processing element may be provided, by which the sensor data stored in the data memory is processed.

Data transmission and communication between the spindle and, in particular, an external EDP station is made possible via an interface of the spindle via which, either starting from the spindle or starting from the external EDP station, a data connection can be built up and maintained.

According to a particularly advantageous method variant, data compression of the vibration signals recorded by the data acquisition element is carried out in the data processing element, the scope of the data being reduced considerably and it being possible for rapid transmission of the remaining quantity of data to take place via the spindle-integrated data interface, for example to an external EDP station for frequency analysis or monitoring. In this case, the data compression method can have recourse to methods which are already known for the data compression of audio signals (for example compression methods in accordance with the "MPEG 1 Part 3" Standard).

In a modification of a compression method in accordance with the "MPEG 1 Part 3" Standard, the psycho-acoustic model used there for data compression, which is oriented to the subjective audiological impression of the user, is advantageously replaced by another compression model, for example by a machine-acoustic model, a model for the generation of vibrations or a model of the machine dynamics.

Thus, characteristic frequencies of the bearing elements (for example of ball bearings) of the spindle shaft mounting of the spindle can be acquired, compressed and transmitted onward. In connection with the frequency monitoring of ball bearings, for example cage circulation frequencies, inner/outer ring rollover frequencies and side bands caused by modulation of these vibrations, etc. occur. Characteristic frequencies of ball bearings are predefined structurally by the design construction of the ball bearing and can be used for a compression model in an encoder integrated in the data processing element.

In this way, the vibration information recorded by the data acquisition elements can be reduced considerably, which means that faster data transmission can take place via a data interface of the spindle to an external EDP station, in which decompression of the transmitted data by a decoder can take place.

In a specific example, during operation of the spindle according to the invention at a spindle shaft rotational speed of about 60 000 rev/min., an interfering frequency of about 8 kHz of the drive motor of the spindle can occur. At the same time, cage revolution frequencies, which are to be recorded and monitored, of the bearing elements of the spindle shaft of the order of magnitude of about 0.4 kHz can occur. In a machine-acoustic compression model, the undesired interfering frequency of 8 kHz can then be suppressed and not taken into account in the data compression in the encoder of the data processing element.

In general, any desired various and refined compression models are conceivable and can be adapted to the respective spindle construction and the respective operating conditions.

The invention is explained in more detail in the drawing FIGURE using an exemplary embodiment.

The drawing FIGURE shows, in a schematic sectional illustration, a spindle 9 having a housing 12, in which an electric motor 11 is accommodated, which drives a shaft 13 accommodated in the bearings 14, 15 and having a tool 10.

According to the drawing FIGURE, the heat produced during operation in the region of the electric motor 11 and of the bearings 14, 15 is led away by the cooling means 16, 17.

Furthermore, a hydraulic unit 18 is provided, which can be activated in order to change the tool 10.

The machine control system 4 of the machine tool, which is not specifically depicted, in which the spindle 9 is accommodated is used to drive, for example, a tool changing element 19, a lubricating device 20, a rectifier 21 and a cooling unit 22 which each—as depicted—are connected inter alia to the hydraulic unit 18, the electric motor 11 and the cooling means 16, 17.

Finally, the spindle 9 also has data acquisition elements (sensors) 2, for example temperature, vibration, angular or rotational speed sensors, etc.

Such data acquisition elements 2, such as the data acquisition element 2b (rotational speed sensor), are connected directly to the machine control system 4, for example the inverter 21, to store the sensor data in the case of spindles according to the prior art (not depicted).

According to the invention, the data acquisition elements 2, depicted here by way of example as a temperature sensor 2a and rotational speed sensor 2b, are also or only connected to the spindle-integrated data storage element 1.

In the data storage element 1, the sensor data from the data acquisition elements 2a, 2b and further data acquisition elements not depicted is stored and, if desired, is conditioned or combined in the likewise spindle-integrated data processing element 3.

Finally, the data storage element 1 and the data acquisition elements 2 can be read out via the interface 5, if desired, by using a likewise spindle-integrated modem element 7.

Via the interface 5, a data connection 24 can be produced to an external EDP station 6 or a telephone connection 8.

Data interchange between EDP station 6 and data storage element 1 and/or data acquisition element 2 can, as described, be carried out in accordance with the various (Internet) data protocols and can take place in a cable-free manner (for example via radio or infrared etc.) or in a cable-bound manner.

Here, the EDP station 6 can be located in the immediate surroundings of the spindle 9 and used by the service personnel, for example as a diagnostic computer. Furthermore, the EDP station 6 as a personal computer or as an EDP system, for example belonging to the manufacturer of the spindle 9, can communicate with the data storage element 1 or the data acquisition element 2 by means of the remote data transmission via the data connection 24 (for example via an Internet connection).

According to the invention therefore, the recorded data from the data acquisition elements 2, that is to say the spindle-integrated sensors, can be recorded separately and read out separately, without there having to be any intervention in the machine control system 4 and therefore agreement of the manufacturer or of the operator of the machine tool.

The interface 5 can also be connected via the connection 25 to the motor control system 4, it being possible via appropriate coding or other identification for the data from the data storage element 1 and from the data acquisition element 2 to be determined, said sensor data being passed on from the data acquisition elements 2 to the machine control system 4 or to the EDP station 6.

Overall, the spindle 9 according to the invention makes it possible to accommodate spindle-internal recorded sensor data from the data acquisition elements 2 optionally internally in the spindle in the data storage element 1 (for example for further processing in the data processing unit 3) or to pass said data on to the machine control system 4.

What is claimed is:

1. A spindle for a machine tool having a machine control system which drives a tool changing element and a lubricating device, a rectifier, and a cooling unit, said spindle comprising:
   (a) a housing;
   (b) an electric motor within said housing connected to the rectifier, said electric motor having cooling means connected to the cooling unit;
   (c) a shaft driven by said motor having a tool holder for receiving a tool used for machining workpieces;
   (d) a hydraulic unit connected to the tool changing element and the lubricating device, said hydraulic unit being activatable in order to change the tool;
   (e) at least one data acquisition element for recording operational or state data of the spindle;
   (f) at least one data storage element integrated in the spindle for storing the recorded data from said at least one data acquisition element;
   (g) at least one data processing element for the data compression of the recorded data from the at least one data acquisition element; and
   (h) at least one interface connectable via a connection to the machine control system, the recorded data from said at least one data storage element and from said at least one data acquisition element being determinable via coding or other identification, said recorded data being passed on from said at least one data acquisition element to the machine control system or to an EDP station in order to permit limited access by the machine control system to said at least one data storage element integrated in the spindle or said at least one data acquisition element.

2. The spindle as claimed in claim 1, wherein at least one data processing element connected to the at least one data storage element.

3. The spindle as claimed in claim 2, wherein the at least one data storage element and/or the at least one data processing element is/are connected to the machine control system of the machine tool for the purpose of data transmission.

4. The spindle as claimed in claim 2, wherein the at least one data storage element and/or the at least one data processing element has/have at least one spindle-integrated interface for data transmission to the EDP station.

5. The spindle as claimed in claim 4, wherein the at least one interface is provided for data transmission in accordance with an Internet data protocol.

6. The spindle as claimed in claim 5, wherein the at least one interface is used for data transmission in accordance with the TCP/IP data protocol.

7. The spindle as claimed in claim 5, wherein the at least one interface is used for data transmission in accordance with the SMTP data protocol.

8. The spindle as claimed in claim 5, wherein the at least one interface is used for data transmission in accordance with the POP data protocol.

9. The spindle as claimed in claim 5, wherein the at least one interface is used for data transmission in accordance with the HTTP data protocol.

10. The spindle as claimed in claim 5, wherein the at least one interface is used for data transmission in accordance with the NNTP data protocol.

11. The spindle as claimed in claim 5, wherein the at least one interface is used for data transmission in accordance with the FTP data protocol.

12. The spindle as claimed in claim 5, wherein the at least one interface is used for data transmission in accordance with the WAP data protocol.

13. The spindle as claimed in claim 5, wherein the at least one data storage element and/or the at least one data processing element has an allocated IP address.

14. The spindle as claimed in claim 4, wherein the at least one interface is designed for cable-free data transmission.

15. The spindle as claimed in claim 4, wherein the at least one interface is designed as an RS232and/or RS485 interface.

16. The spindle as claimed in claim 4, wherein the at least one interface is designed as a data bus interface for data transmission in accordance with the USB (PC) protocol.

17. The spindle as claimed in claim 4, wherein the at least one interface is designed as a data bus interface for data transmission in accordance with the PROFIBUS-Dp protocol.

18. The spindle as claimed in claim 4, wherein the at least one interface is designed as a data bus interface for data transmission in accordance with the INTERBUS-S protocol.

19. The spindle as claimed in claim 4, wherein the at least one interface is designed as a data bus interface for data transmission in accordance with the CAN-BUS protocol.

20. The spindle as claimed in claim 4, wherein the at least one interface is designed as a data bus interface for data transmission in accordance with the SERCOS protocol.

21. The spindle as claimed in claim 1, wherein a spindle-integrated modem element is provided to produce a data connection to a telephone connection.

22. A method of operating a spindle for a machine tool having a machine control system which drives a tool changing element and a lubricating device, a rectifier, and a cooling unit, said method comprising the steps of:
  (a) providing a spindle comprising a housing, an electric motor within said housing connected to the rectifier, the electric motor having cooling means connected to the cooling unit, a shaft driven by said motor having a tool holder for receiving a tool used for machining workpieces, a hydraulic unit connected to the tool changing element and the lubricating device, the hydraulic unit being activatable in order to change the tool, at least one data acquisition element, at least one data storage element integrated in the spindle, at least one data processing element for the data compression of the recorded data from the at least one data acquisition element, and at least one interface connectable via a connection to a machine control system;
  (b) recording operational or state data of the spindle during operation;
  (c) storing the recorded data from step (b) into the at least one data storage element;
  (d) determining the recorded data from said at least one data storage element and from said at least one data acquisition element via coding or other identification; and
  (e) passing on said recorded data from said at least one data acquisition element to the machine control system or to an EDP station in order to permit limited access by the machine control system to said at least one data storage element integrated in the spindle or said at least one data acquisition element.

23. The method as claimed in claim 22, wherein the data stored in the at least one data storage element is processed in the at least one data processing element.

24. The method as claimed in claim 23, wherein the data compression is carried out by data compression methods which are suitable in particular for the data compression of recorded vibration signals.

25. The method as claimed in claim 24, wherein data compression is carried out by a data compression method according to the MPEG 1 Part 3 Standard.

26. The method as claimed in claim 22, wherein data transmission to the EDP station is carried out via an interface of the at least one data storage element and/or data processing element.

27. The method as claimed in claim 26, wherein data signals are transmitted from the spindle to the EDP station via the interface in the event of a functional disruption.

28. The method as claimed in claim 26, wherein the state and/or operating data of the spindle are interrogated by the EDP station by means of the data transmission.

* * * * *

UNITED STATES PATENT AND TRADEMARK OFFICE
CERTIFICATE OF CORRECTION

PATENT NO. : 7,011,613 B2
DATED : March 14, 2006
INVENTOR(S) : Möller et al.

It is certified that error appears in the above-identified patent and that said Letters Patent is hereby corrected as shown below:

<u>Column 6,</u>
Line 50, after "wherein" add -- said --.
Line 51, after "element" add -- is --.

<u>Column 7,</u>
Line 25, change "RS232and/or" to -- RS232 and/or --.

<u>Column 8,</u>
Line 34, after "suitable" delete "in particular".
Line 36, after "wherein" insert -- the --.

Signed and Sealed this

Sixteenth Day of May, 2006

JON W. DUDAS
*Director of the United States Patent and Trademark Office*